Patented Apr. 6, 1954

2,674,622

UNITED STATES PATENT OFFICE 2,674,622

PREPARATION OF POLYCHLOROPHENOXY-ACETIC ACIDS

Archibald Gillies, Guelph, Ontario, and Harold R. Chipman, Elmira, Ontario, Canada, assignors to United States Rubber Company, New York, N. Y., a corporation of New Jersey No Drawing. Application October 2, 1951, Serial No. 249,406

3 Claims. (Cl. 260—521)

This invention relates to methods of preparing polychlorophenoxyacetic acids useful as plant growth regulators, particularly 2,4-dichlorophenoxyacetic acid (commonly known as "2,4-D") and 2,4,5-trichlorophenoxyacetic acid (commonly known as "2,4,5-T"). Still more particularly it relates to methods of preparing such acids which give commercially important increases in yield over conventional preparative methods.

We have discovered that a commercially important increase in yield of a polychlorophenoxyacetic acid can be obtained by preparing the reaction mixture in a particular manner. More specifically, our invention resides in the preparation of a reaction mixture comprising alkali metal salts of the polychlorophenol and the monochloroacetic acid by first forming a mixture of the polychlorophenol and the monochloroacetic acid and adding thereto with agitation an aqueous alkali metal hydroxide solution while preventing the temperature of the mixture undergoing neutralization from exceeding 60° C. We have found that even greater increases in yield are obtained if the temperature during neutralization is kept from exceeding 40° C. and still better results are obtained if the temperature is kept from exceeding 20° C. during the neutralization. If the temperature is to be kept from rising above 20° C., it is, as a practical matter, necessary to apply extraneous cooling means to the vessel in which the neutralization is being conducted. Such cooling can be accomplished in any well-known manner.

It was surprising to find that control of temperature during neutralization in accordance with the present invention would beneficially affect the yield of polychlorophenoxyacetic acid because prior to our invention it was believed that slow addition of the alkali metal hydroxide to the pre-mixed polychlorophenol and monochloroacetic acid would give a lower yield of the product because of the longer time of contact of the monochloroacetic acid and the alkali metal salt thereof with the alkali metal hydroxide and because of the increased opportunity for hydrolysis of alkali metal monochloroacetate during the step of heating the resulting reaction mixture to the reaction temperature. As a matter of fact, it was previously thought that it was advantageous to add the alkali metal hydroxide to the polychlorophenol-monochloroacetic acid mixture as rapidly as possible and to allow the heat of neutralization to raise the temperature of the mixture as rapidly as possible to the reaction temperature, it being supposed that this procedure gave the best yield of product.

In the practice of our invention the temperature during neutralization of the polychlorophenol-monochloroacetic acid mixture with the aqueous alkali metal hydroxide solution is prevented from exceeding the values given above in any suitable manner as by adding the aqueous alkali metal hydroxide solution slowly or by extraneously cooling the neutralization vessel or by the use of both of these measures. For example, it is often commercially practicable to keep the temperature of the mixture from exceeding 60° C. or even 40° C. by slowly adding the alkali metal hydroxide solution without the necessity of applying extraneous cooling to the mixture being neutralized. However if sufficient extraneous cooling is provided alternatively to or in addition to slow caustic addition, considerable shorter times of neutralization can be used thereby materially increasing the productivity of a given plant. Those skilled in the art will readily appreciate that the numerous factors involved such as rapidity of addition of the alkali metal hydroxide solution, dissipation of heat by radiation, extent of extraneous cooling, initial temperature of the materials being brought together and the temperature of the mixture must be correlated in order to achieve the desired results. For example, if the temperature is kept from exceeding 20° C. during the addition, it is possible to complete the addition in 30 minutes in a typical operation. The addition time is not, however, limited to 30 minutes but can extend over 2 to 3 hours. The indications are that the neutralized reaction mixture prepared by the method of our invention can, if desired, be held at room temperature for a considerable period of time, e. g., at least 24 hours, prior to heating to the reaction temperature, without seriously affecting the yield of product.

In a typical embodiment of our invention we first form a solution of the polychlorophenol and the monochloroacetic acid. We generally employ a substantial molar excess of the polychlorophenol over the monochloroacetic acid since we find that this favors higher yields of product based on monochloroacetic acid. Usually we use a molar ratio of polychlorophenol to monochloroacetic acid ranging from 1.2 : 1 to 1.6 : 1. If an organic carrier liquid is to be present during the reaction, we employ the carrier liquid as a mutual solvent dissolving the polychlorophenol and the monochloroacetic acid in the carrier liquid. We then add the aqueous alkali metal hydroxide solution to the resulting mutual solution under controlled temperature conditions. If no organic carrier liquid is to be present during the reaction, we form a mutual solution of the polychlorophenol and the monochloroacetic acid by mixing these materials and warming them sufficiently, e. g., to about 45° C., to cause them to melt together whereupon the resulting mutual solution preferably is cooled somewhat, e. g., to 30° C. or more preferably to 20° before proceeding with the controlled temperature addition of the alkali metal hydroxide solution.

After completing addition of the alkali metal hydroxide solution with temperature control as indicated above, we effect reaction in the conventional manner by heating the resulting mixture under reaction conditions, typically at a reaction temperature ranging from 70° to 120° C., until the alkali metal salts of the polychlorophenol and the monochloroacetic acid have reacted to form the alkali metal salt of the polychlorophenoxyacetic acid whereupon the product polychlorophenoxyacetic acid is recovered from the reaction mixture in any suitable manner, typically by neutralization with a mineral acid followed by cooling to precipitate the product which is then separated in any conventional way as by filtration.

We prefer to carry out the reaction by heating the reaction mixture, which results from the above-described neutralization under controlled temperature conditions, at its boiling point under refluxing conditions until the reaction is substantially complete. We find that short reaction times are adequate to effect substantially complete reaction. For example, reaction times of 1 hour are adequate. We can even use a reaction time as short as ½ hour and still obtain substantially complete reaction. We consider the reaction to be essentially complete when substantially all of the monochloroacetic acid or alkali metal salt thereof has been consumed.

The relative amounts of reactants, carrier liquid, if used, water and alkali metal hydroxide can vary widely in the practice of our invention. Those skilled in the art can readily select suitable relative proportions of polychlorophenol, monochloroacetic acid, carrier liquid, water in addition to that formed by neutralization, and alkali metal hydroxide. Generally speaking, we prefer to employ an amount of alkali metal hydroxide substantially equal to that required to neutralize all acidic materials present, e. g., to form a finished reaction mixture having a pH between 8.3 to 9.3 as determined by phenolphthalein and thymolphthalein. The only acidic materials present will be the polychlorophenol and the monochloroacetic acid reactants, aside from any free polychlorophenoxyacetic acid which may be present in small amounts in carrier liquid recovered from a preceding operation and re-used. Hence, we generally use that number of moles of alkali metal hydroxide which is substantially equal to the sum of the moles of the polychlorophenol and monochloroacetic acid charged plus the polychlorophenoxyacetic acid and polychlorophenol present in the recycled carrier liquid.

The amount of water, or of water and carrier liquid, present in the reaction mixture should be sufficiently large to render the reaction mixture liquid and stirrable throughout the reaction. Generally speaking, if the amount of either the water or the carrier liquid is reduced, the amount of the other must be increased in order to render the reaction mixture sufficiently mobile to allow agitation.

The amount of water present during reaction can be as small as that represented by an amount just sufficient to dissolve the alkali metal hydroxide plus the water formed by the neutralization of the acidic materials present with the alkali metal hydroxide. It can range upwardly from such a value to a value as high as 100% of the reactants. Typically, the total amount of water present during the reaction ranges from 30 to 60% by weight based on the weight of polychlorophenol and monochloroacetic acid reactants. If use of the carrier liquid during the reaction is eliminated, we generally employ an amount of water ranging from 50 to 60% based on the sum of polychlorophenol and monochloroacetic acid. If the carrier liquid is used, we typically employ a smaller amount of water, often ranging from 40 to 50% based on the sum of polychlorophenol and monochloroacetic acid.

We add the alkali metal hydroxide in the form of an aqueous solution since it is easier to dissipate and control the heat of neutralization by cooling. Generally speaking, we neutralize with an aqueous solution containing from 40 to 60% by weight of alkali metal hydroxide.

Those skilled in the art will appreciate that it is desirable to have present as small an amount of water as possible during the reaction because of greater productivity of given equipment and reduced opportunity for hydrolysis of monochloroacetic acid with adverse effect upon the yield of product based thereon.

The amount of carrier liquid employed can vary widely but typically ranges from ½ to 3 times the weight of the polychlorophenol and the monochloroacetic acid. Again the amount should be kept as small as possible, consistent with other factors encountered, in order to attain maximum productivity.

The carrier liquid can be any substantially water-insoluble inert organic liquid which is a solvent for the polychlorophenol and relatively a much poorer solvent for the polychlorophenoxyacetic acid product. It should be liquid at temperatures encountered in the process. Its boiling point should be such that the reaction mixture boils at a suitable elevated temperature, e. g., 70–120° C. Almost invariably the carrier liquid will be either a hydrocarbon or a halogenated hydrocarbon. Examples of suitable carrier liquids are set forth in U. S. patents to Warren 2,480,817 and 2,561,547 the disclosures of which are incorporated herein by reference. In commercial practice, we have obtained very good results using either monochlorobenzene or a mixture of Stoddard Solvent and xylene we often use roughly equal volumes of Stoddard Solvent and xylene. An example of Stoddard Solvent is the material sold commercially as "Shellsol."

The polychlorophenol used in the practice of our invention is almost invariably either 2,4-dichlorophenol or 2,4,5-trichlorophenol, these yielding 2,4-D and 2,4,5-T, respectively.

Our invention avoids the complications which would be involved were it attempted to separately pre-form the alkali metal salts of the polychlorophenol and the monochloroacetic acid and to then react these pre-formed salts. Our invention, by first mixing the polychlorophenol and the monochloroacetic acid and then forming the alkali metal salts thereof simultaneously in a single operation, avoids the equipment requirements which would be entailed in a process in which the salts were separately pre-formed. Processes involving separately pre-forming the alkali metal salts and subsequently bringing the pre-formed salts are far less desirable commercially than the process of our invention.

When the neutralization and the reaction are carried out in the absence of the carrier liquid, we prefer to add an inert substantially water-insoluble organic liquid which is a good solvent for the polychlorophenol and relatively a poor solvent for the product and which can conveniently be of the type set out above and in the above-cited Warren patents, to the reaction mixture after reaction is complete but prior to the acidification step in accordance with Warren U. S. Patent 2,561,547. We then typically carry out the acidification step at a temperature of from 70 to 90° C. at which the mixture is entirely liquid, i. e., all organic material being in solution, whereupon we cool the mixture to below 40° C., generally to room temperature, and filter off the product polychlorophenoxyacetic acid.

The following examples illustrate our invention more fully. All parts are by weight.

*Example 1*

This example illustrates the preparation of 2,4-D by a process in which the reactants are neutralized with caustic which is added rapidly and without any attempt to control the temperature of the mixture undergoing neutralization.

Ninety-four and one-half parts (1.0 mole) of monochloroacetic acid, 225 parts (1.38 moles) of 2,4-dichlorophenol and 505 parts of monochlorobenzene were placed in a reaction vessel equipped with an agitator and a reflux condenser. These ingredients were agitated until the monochloroacetic acid and the 2,4-dichlorophenol were dissolved, whereupon 195 parts of a 48.6% aqueous solution of sodium hydroxide (which furnished 2.37 moles of NaOH) were added to the mixture over a period of 30 seconds. The temperature rose rapidly to the refluxing point. The mixture was then heated under refluxing conditions (100° C.) for 1 hour. There were then added 260 parts of warm water and 356 parts of 27% sulfuric acid. After crystallization of the 2,4-D started 500 parts of water were added. The resulting mixture was cooled to 14° C. and filtered. The 2,4-D filter cake was then washed with 250 parts of cold water and dried at 80° C. The dry weight was 179 parts representing a yield of 81.3% based on the monochloroacetic acid.

*Example 2*

This example illustrates the significant improvement in yield brought about by the controlled temperature addition of the caustic in accordance with our invention.

The procedure of Example 1 was followed exactly except that the mixture of monochloroacetic acid, 2,4-dichlorophenol and monochlorobenzene was cooled to 15° C. before the addition of the aqueous caustic solution was begun. The aqueous caustic solution was added over a period of 30 minutes with maintenance of the temperature of the mixture at between 15° and 20° C. by the use of cooling water circulated in heat exchange relation with the body of the mixture being neutralized. The resulting mixture was then heated to the refluxing temperature over a period of 20 minutes, held at reflux for 1 hour and was thereafter treated in the same manner as in Example 1. The yield of dry 2,4-D was 188.5 parts, corresponding to a yield of 85.6% based on monochloroacetic acid. This increase in yield is of a magnitude such as to be important commercially.

*Example 3*

This example, like Example 1, illustrates the lower yield which is obtained when the temperature of the mixture is not controlled during the addition of the caustic.

To a reactor equipped with an agitator and a refluxing condenser, we charged 277.5 parts of a "Shellsol"-xylol solvent recovered from a previous preparation of 2,4-D in accordance with Warren Patent 2,480,817 (This recovered solvent contained 14.8% of 2,4-dichlorophenol and 8.5% of 2,4-D dissolved in approximately equal parts of "Shellsol" and xylol.), 47.3 parts (0.5 mole) of monochloroacetic acid, 83.0 parts (0.51 mole) of 2,4-dichlorophenol and 30.0 parts of fresh "Shellsol." After solution of the reactants in the carrier liquid had been effected, the solution was cooled to 150° C., whereupon the application of cooling water was discontinued. We then added 110 parts of an aqueous 48.6% solution of sodium hydroxide (furnishing 1.33 moles of NaOH) as rapidly as possible (over 10-15 seconds). The temperature of the mixture rose to 81° C. It was then heated to reflux and refluxed for 1½ hours. The reacted mixture was then cooled to 90° C., whereupon 100 parts of hot water and 148 parts of 27% sulfuric acid were added. When crystallization of the 2,4-D began, an additional 100 parts of water was added. The mixture was then cooled and filtered in the conventional manner. The weight of dry 2,4-D obtained was 93 parts. The recovered carrier liquid weighed 272 parts and precipitated 1.4 parts of dry 2,4-D giving a total yield of 94.4 parts or 85.8% based on monochloroacetic acid.

*Example 4*

The procedure of Example 3 was duplicated exactly except that the caustic was added over a one-half hour period while the temperature of the mixture undergoing neutralization was kept from exceeding 20° C. by the use of extraneous cooling water circulated in heat exchange. The neutralized mixture was heated to the refluxing point over 15 minutes and was held at the refluxing temperature (103.5° C.) for only one-half hour (instead of 1½ hours as in Example 3), whereupon the reacted mixture was treated as in Example 3. The dry weight of the crystallized 2,4-D recovered as a filter cake was 99.7 parts corresponding to a yield of 90.4% based on monochloroacetic acid. The higher yield despite the shorter reaction time is commercially important. The weight of recovered carrier liquid was 300 parts and no effort was made to recover the 2,4-D content of this carrier liquid.

*Example 5*

This example (which is included for purposes of comparison) illustrates the process in which the carrier liquid is not present during the period of reaction and the alkali is added as rapidly as possible, with no temperature control during the neutralization of the acidic components.

The following table gives the relative proportions of reactants, sodium hydroxide and extraneous water, together with the yield figures.

| 2,4-Dichlorophenol | Monochloroacetic acid, g. | 100% NaOH, g. | $H_2O$ Added With NaOH | 2,4-D Yield, Parts | 2,4-D Yield, Percent of Theoretical |
|---|---|---|---|---|---|
| 97.8 g | 47.3 | 44 | 110 | 92 | 83.2 |
| 106 g | 47.3 | 46 | 120 | 85.2 | 77.2 |
| 114.1 g | 47.3 | 48 | 130 | 89.1 | 80.8 |
| 97.8 g | 47.3 | 44 | 112 | 90.0 | 81.4 |
| 106 g | 47.3 | 46 | 112 | 91.0 | 82.2 |

In carrying out the runs of this example the 2,4-dichlorophenol and the monochloroacetic acid were placed in a reactor equipped with an agitator, cooling jacket and reflux condenser and were melted together by heating to about 45° C. When all the acidic components were in a molten state at 45° C., an aqueous solution of the sodium hydroxide in the indicated amount of water was added as rapidly as possible (15–20 seconds). The mixture was brought to reflux temperature, 108° C., by the heat of neutralization and by the heat of reaction at the higher temperatures and held at 104–108° C., for 1 hour whereupon it was cooled to 100° C. We then added either 110 parts of monochlorobenzene, or an equivalent volume of a Shellsol:Xylol (50:50) mixture, followed by 71 parts of concentrated hydrochloric acid dissolved in 50 parts of water. The resulting mixture was cooled with stirring until it had crystallized, whereupon it was cooled to room temperature and filtered, the filter cake being washed with water and dried.

The relatively low yields obtained by the procedure of Example 5 compared to the yields made possible by our invention are noteworthy.

Example 6

This example illustrates an embodiment of our invention in which the organic liquid is not present during the period of reaction but is added just before acidification. Slightly more water is present during reaction in order to render the reaction mixture more fluid. The proportions of chemicals used and the yields obtained are given in the following table.

| 2,4-Dichlorophenol | Monochloroacetic acid | NaOH | H₂O Added with NaOH | Parts | Yield of 2,4-D, Percent of Theoretical (based on monochloroacetic acid charged) | |
|---|---|---|---|---|---|---|
| 97.8 | 47.3 | 44 | 60 | 98.2 | 88.8 | |
| 97.8 | 47.3 | 44 | 60 | 98.4 | 89.0 | |
| 106.0 | 47.3 | 44 | 60 | 97.5 | 88.2 | |
| 106.0 | 47.3 | 44 | 60 | 97.8 | 88.4 | |

In carrying out the runs of this example the 2,4-dichlorophenol and the monochloroacetic acid were placed in a reactor equipped with agitator, cooling jacket and reflux condenser and were melted together by heating to about 45° C. The melted mixture was then cooled to 30° C., whereupon the aqueous solution of the sodium hydroxide in the indicated amount of water was added slowly with stirring and maintenance of the temperature of the mixture as nearly to 30° C. as possible. After all of the alkali had been added in this manner, the mixture was heated to 90–95° C., whereupon almost complete solution of all ingredients took place. The mixture was held at this temperature until crystallization began. This allowed many small crystals to form and produced a slurry which could be easily stirred. The heat of crystallization brought the temperature of the mixture up to the refluxing point (about 108° C.). The mixture was reacted at this temperature for 1 hour, whereupon it was cooled to 100° C. We then added either 110 parts of monochlorobenzene or an equivalent volume of the "Shellsol"-xylol (50:50) mixture, followed by 71 parts of concentrated hydrochloric acid dissolved in 50 parts of water. The resulting mixture was cooled with stirring until it had crystallized, whereupon it was cooled to room temperature and filtered, the filter cake being washed with water and dried.

In all of the foregoing examples the quality of the 2,4-D produced was, without further purification equivalent to that of the technical 2,4-D acid of commerce. The initial melting point of the product starts at a minimum of 138° C., in all of the above examples.

Example 7

This example illustrates the preparation of 2,4,5-T wherein the caustic is added at a controlled temperature of 20° C. over ½ hour followed by heating to reaction temperature.

| | |
|---|---|
| 2,4,5-trichlorophenol (technical) | 266 |
| Monochloroacetic acid | 94.5 |
| Xylol | 250 |
| "Shellsol" | 250 |
| NaOH—50% aqueous solution | 193 |

The monochloroacetic acid and 2,4,5-trichlorophenol were added to the xylol-"Shellsol" solvent at 20° C. and the mixture was heated to 50° C. to effect complete solution. The mixture was then cooled to 15° C. and the 50% caustic added slowly over ½ hour maintaining the temperature at 20–25° C. by extraneous cooling. When all the caustic was added the cooling bath was removed and the slurry heated to reflux at 104–108° C. Heating at reflux was continued for 1 hour. The reaction mixture was then diluted with 300 g. of water and acidified with 300 ml. of 33% sulfuric acid. The acidified mixture was cooled to 15° C. and filtered. Dry weight of 2,4,5-T=214.8 g.l.=84.2% yield. M. P.=153.8–154.8° C.

Example 8

This example (which is given for comparison with Example 7) illustrates the preparation of 2,4,5-T wherein the caustic is added all at once with no temperature control, the mixture being heated to reflux as rapidly as possible.

| | |
|---|---|
| 2,4,5-trichlorophenol (technical) | 266 |
| Monochloroacetic acid | 94.5 |
| Xylol | 250 |
| "Shellsol" | 250 |
| NaOH—50% aqueous solution | 193 |

The monochloroacetic acid and 2,4,5-trichlorophenol were added to the xylol-"Shellsol" solvent at 20° C. and the mixture heated to 50° C. to effect complete solution. The mixture was cooled to 20° C. and the 50% caustic added as rapidly as possible with no temperature control. The temperature of the mixture rose rapidly to 80° C. and heat was then applied immediately to raise the temperature to reflux at 104–108° C. The mixture was heated at reflux for 1 hour. The reaction mixture was diluted with 300 g. of water and acidified with 300 ml. of 33% sulfuric acid. The acidified mixture was cooled to 15° C. and filtered. Dry weight of 2,4,5-T=205 g.= 80.3% yield. M. P.=154.2–155.6° C. The reduction in yield is commercially significant.

From the foregoing it will be seen that we have made available to the art a method of making polychlorophenoxyacetic acids, especially 2,4-D and 2,4,5-T, which offers many advantages. It will be seen that the controlled temperature addition of the caustic during the preparation of the reaction mixture, in accordance with our invention, effects significant and commercially important increases in yield of product based upon the monochloroacetic acid charged. It will also be seen that the procedure of our invention can be applied to existing plant facilities for the manufacture of 2,4-D, 2,4,5-T or the like without requiring extensive changes in equipment or technique. The invention enables high yields to be obtained whether the "carrier liquid process" of Warren 2,480,817 or the "aqueous process" of Warren 2,561,547 be employed. Numerous other advantages of our invention will be apparent to those skilled in the art.

Having thus described our invention, what we claim and desire to protect by Letters Patent is:

1. The method of making a polychlorophenoxyacetic acid useful as a plant growth regulator which comprises forming a solution of a polychlorophenol and monochloroacetic acid in a substantially water-insoluble inert organic liquid selected from the group consisting of hydrocarbons and halogenated hydrocarbons, adding an aqueous alkali metal hydroxide solution to said solution with agitation and thereby forming the alkali metal salts of said polychlorophenol and said acid, preventing the temperature of the mixture from exceeding 60° C. during said adding step, the relative proportions of reactants, said organic liquid, water and alkali metal hydroxide being such as to give a reaction mixture having a pH of from 8.3 to 9.3 and containing said carrier liquid in amount equal to from ½ to 3 times the weight of reactants and water in amount equal to from 30 to 60% by weight based on the reactants, the molar ratio of polychlorophenol to monochloroacetic acid in the reaction mixture being substantially in excess of 1:1, thereafter heating the resulting mixture under reaction conditions to effect reaction with the formation of the alkali metal salt of the corresponding polychlorophenoxyacetic acid, and recovering the product polychlorophenoxyacetic acid from the resulting reaction mixture, the yield of said product being substantially increased as a result of preventing the temperature of the mixture from exceeding 60° C. during said adding step.

2. The method of making a polychlorophenoxyacetic acid useful as a plant growth regulator which comprises forming a solution of a polychlorophenol and monochloroacetic acid in a substantially water-insoluble inert organic liquid selected from the group consisting of hydrocarbons and halogenated hydrocarbons, adding an aqueous alkali metal hydroxide solution to said solution with agitation and thereby forming the alkali metal salts of said polychlorophenol and said acid, preventing the temperature of the mixture from exceeding 40° C. during said adding step, the relative proportions of reactants, said organic liquid, water and alkali metal hydroxide being such as to give a reaction mixture having a pH of from 8.3 to 9.3 and containing said carrier liquid in amount equal to from ½ to 3 times the weight of reactants and water in amount equal to from 30 to 60% by weight based on the reactants, the molar ratio of polychlorophenol to monochloroacetic acid in the reaction mixture being substantially in excess of 1:1, thereafter heating the resulting mixture under reaction conditions to effect reaction with the formation of the alkali metal salt of the corresponding polychlorophenoxyacetic acid, and recovering the product polychlorophenoxyacetic acid from the resulting reaction mixture, the yield of said product being substantially increased as a result of preventing the temperature of the mixture from exceeding 40° C. during said adding step.

3. The method of making a polychlorophenoxyacetic acid useful as a plant growth regulator which comprises forming a solution of a polychlorophenol and monochloroacetic acid in a substantially water-insoluble inert organic liquid selected from the group consisting of hydrocarbons and halogenated hydrocarbons, adding an aqueous alkali metal hydroxide solution to said solution with agitation and thereby forming the alkali metal salts of said polychlorophenol and said acid, preventing the temperature of the mixture from exceeding 20° C. during said adding step by extraneously cooling the mixture, the relative proportions of reactants, said organic liquid, water and alkali metal hydroxide being such as to give a reaction mixture having a pH of from 8.3 to 9.3 and containing said carrier liquid in amount equal to from ½ to 3 times the weight of reactants and water in amount equal to from 30 to 60% by weight based on the reactants, the molar ratio of polychlorophenol to monochloroacetic acid in the reaction mixture being substantially in excess of 1:1, thereafter heating the resulting mixture under reaction conditions to effect reaction with the formation of the alkali metal salt of the corresponding polychlorophenoxyacetic acid, and recovering the product polychlorophenoxyacetic acid from the resulting reaction mixture, the yield of said product being substantially increased as a result of preventing the temperature of the mixture from exceeding 20° C. during said adding step.

References Cited in the file of this patent

UNITED STATES PATENTS

| Number | Name | Date |
| --- | --- | --- |
| 2,480,817 | Warren | Aug. 30, 1949 |
| 2,516,611 | Berhenke et al. | July 25, 1950 |
| 2,585,875 | Swaney et al. | Feb. 12, 1952 |

FOREIGN PATENTS

| Number | Country | Date |
| --- | --- | --- |
| 573,510 | Great Britain | Nov. 23, 1945 |
| 948,477 | France | Jan. 31, 1949 |

OTHER REFERENCES

Berhenke et al.: Ind. and Eng. Chem., vol. 38, pp. 544–546 (1946).